(12) United States Patent
Tanida

(10) Patent No.: US 7,009,356 B2
(45) Date of Patent: Mar. 7, 2006

(54) WIPER CONTROL APPARATUS AND METHOD FOR AUTOMATIC VEHICULAR WIPING

(75) Inventor: Katsunori Tanida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/043,136

(22) Filed: Jan. 27, 2005

(65) Prior Publication Data

US 2005/0174082 A1    Aug. 11, 2005

(30) Foreign Application Priority Data

Feb. 6, 2004   (JP)   ............................... 2004-31246

(51) Int. Cl.
*H02P 1/04*    (2006.01)
*G05B 5/00*    (2006.01)

(52) U.S. Cl. .................. 318/483; 318/445; 318/443; 318/444; 318/DIG. 2; 15/250.001; 15/250.12; 160/11

(58) Field of Classification Search ................ 318/443, 318/444, 483, 452, 456, 281, DIG. 2; 160/11
See application file for complete search history.

(56) References Cited

U.S. PATENT DOCUMENTS

| | | | | |
|---|---|---|---|---|
| 5,780,719 A | * | 7/1998 | VanDam | .................... 73/29.01 |
| 6,175,205 B1 | * | 1/2001 | Michenfelder et al. | ..... 318/444 |
| 6,239,570 B1 | * | 5/2001 | Tanaka et al. | .............. 318/483 |
| 6,396,397 B1 | * | 5/2002 | Bos et al. | .................... 340/461 |
| 2003/0192566 A1 | * | 10/2003 | Neubauer et al. | ............... 134/1 |
| 2004/0141057 A1 | * | 7/2004 | Pallaro et al. | .............. 348/148 |
| 2004/0143380 A1 | * | 7/2004 | Stam et al. | .................... 701/36 |
| 2004/0218401 A1 | * | 11/2004 | Okubo et al. | ............... 362/526 |
| 2005/0134483 A1 | * | 6/2005 | Monji et al. | ................. 340/933 |

FOREIGN PATENT DOCUMENTS

JP    A-2001-099948    4/2001

* cited by examiner

*Primary Examiner*—David Martin
*Assistant Examiner*—Elias Hiruy
(74) *Attorney, Agent, or Firm*—Posz Law Group, PLC

(57) ABSTRACT

The wiper control apparatus comprises a precipitation detector, a surrounding state detector and a wiper controller. The precipitation detector detects a precipitation condition at a position where the vehicle is. The surrounding state detector detects an exit of the vehicle out of a roofed space. The wiper controller controls the wiper to be in an automatic operation mode according to the precipitation condition detected by the precipitation detector, and controlling the precipitation detector to detect the precipitation condition following the exit detected by the surrounding state detector in a response time shorter than the normal response time for the precipitation detector to detect the precipitation not following the exit.

14 Claims, 3 Drawing Sheets

WIPER CONTROL APPARATUS AND METHOD FOR AUTOMATIC VEHICULAR WIPING

CROSS REFERENCE TO RELATED APPLICATION

This application is based upon and claims the benefit of priority of Japanese Patent Application No. 2004-031246 filed on Feb. 6, 2004, the content of which is incorporated herein by reference.

FIELD OF THE INVENTION

The present invention relates to a wiper control apparatus for operating a wiper of a vehicle and a wiper control method for operating a wiper of a vehicle.

BACKGROUND OF THE INVENTION

Conventional automatic wiper controller controls a vehicular wiper according to a detected amount of adhesion water caused by raindrops on a windshield. The automatic wiper controller has a control circuit, an infrared ray sensor, and so on. The infrared ray sensor irradiates an infrared ray toward the windshield and detects the infrared ray reflected on a surface of the windshield. The control circuit detects the amount of the adhesion water by the magnitude of the reflected infrared ray. The control circuit operates using a threshold value for preventing the wiper from operating erroneously by disturbances such as noises, and automatically activates the wiper when the detected amount of the adhesion water exceeds the threshold value.

When the vehicle travels out of a roofed space such as a tunnel and foot of bridge, the driver needs some time to adapt the difference of brightness inside of the roofed space and that outside of the roofed space. If it rains outside the roofed space, the driver's sight outside of the roofed space becomes worse and time required to adapt the difference extends. Thus, it is desirable to activate the wiper as soon as possible when the vehicle travels out of the roofed space into outside space where it rains.

However, the conventional automatic wiper controller activates the wiper after some response time, because the amount of the adhesion water is little immediately after running out of the roofed space and the control circuit determines a precipitation only when the detected amount of the adhesion water exceeds the threshold value.

SUMMARY OF THE INVENTION

An object of the present invention is to provide a wiper control apparatus and a wiper control method for operating a wiper of a vehicle, whose response time is shorter even when the vehicle travels out of a roofed space into an outside space where it rains.

To achieve the above object, a wiper control apparatus according to the present invention comprises a precipitation detector, a surrounding state detector and a wiper controller.

The precipitation detector detects a precipitation condition at a position where the vehicle is. The surrounding state detector detects an exit of the vehicle out of a roofed space. The wiper controller automatically controls the wiper to start a wiping operation according to the precipitation condition detected by the precipitation detector, and controlling the precipitation detector to detect the precipitation condition following the exit detected by the surrounding state detector in a response time shorter than another response time for the precipitation detector to detect the precipitation not following the exit.

It is desirable that the wiper controller increases a sensitivity of the precipitation detector when the surrounding state detector detects the exit.

It is also desirable that the wiper controller activates the wiper when the precipitation detector detects a precipitation amount (the precipitation condition) more than a predetermined threshold value, and decreases the predetermined value when the surrounding state detector detects the exit.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Figure 1:
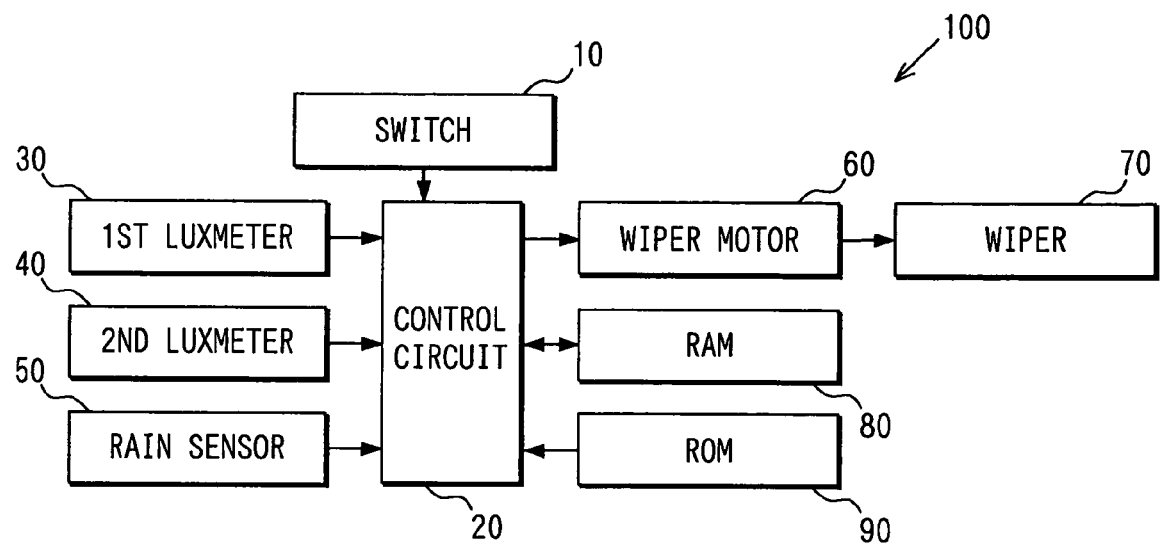
FIG. 1 is a block diagram of a wiper control apparatus for operating a wiper of a vehicle according to an embodiment of the present invention.

As shown in FIG. 1, a wiper control apparatus 100 according to the embodiment has a wiper switch 10, a control circuit 20, a first illuminometer 30, a second illuminometer 40, a rain sensor 50, a wiper motor 60, a wiper 70, a RAM 80 and a ROM 90.

The wiper switch 10 generates operation signals and outputs the operation signals to the control circuit 20 thereby to direct the wiper motor 60 to operate in respective operation modes according to switching operations. The operation modes are a stop mode, an automatic mode, an intermittent mode, a low speed mode, a high speed mode or the like.

The control circuit 20 is implemented by a conventional microcomputer and controls the wiper motor 60 by the operational signals to operate in one of the above modes instructed by the wiper switch 10.

When the wiper switch 10 generates the operation signal to operate the wiper motor 60 in the automatic mode, the control circuit 20 determines a driving signal for controlling the wiper motor 60 in respective operation modes based on detection signals generated by the first illuminometer 30, the second illuminometer 40, the rain sensor 50, and so on. The detection signal generated by the rain sensor 50 indicates the precipitation amount. When the detection signal indicates a small amount of precipitation, the driving signal operates the wiper motor 60 in the low speed mode. When the detection signal indicates a large amount of precipitation, the driving signal operates the wiper motor 60 in the high speed mode.

The control circuit 20 also determines a current value flowing through an emission portion 50a of the rain sensor 50, based on the detection signals generated by the first illuminometer 30, the second illuminometer 40 and so on.

When the wiper switch 10 generates the operation signal operating the wiper motor 60 in the manual modes including the stop mode, the intermittent mode, the slow mode and the fast mode, the control circuit 20 determines a driving signals for controlling the wiper motor 60 in respective operation modes based on the operation signals generated by the wiper switch 10.

The first illuminometer 30 and the second illuminometer 40 are for detecting whether the vehicle is traveling into a space under roof (hereinafter referred to as roofed space) such as a tunnel, a foot space under a bridge, whether the vehicle is traveling out of the roofed space, and whether it is daytime or nighttime.

Figure 2:
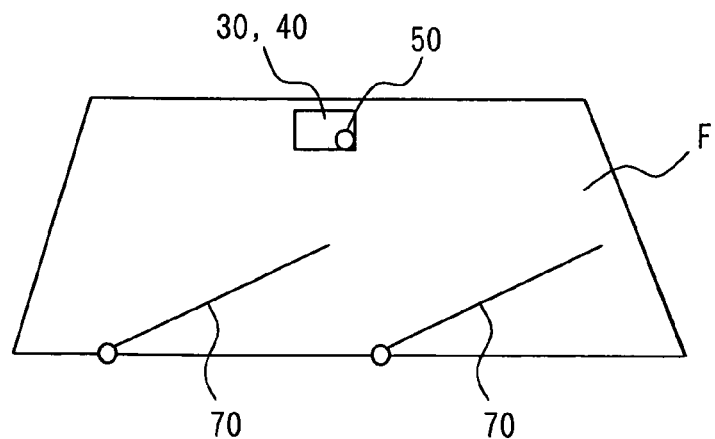
FIG. 2 is a schematic view showing an installation of the wiper control apparatus on a rear face of the windshield according to the embodiment.

The first illuminometer 30, the second illuminometer 40 and the rain sensor 50 are located in a casing of a sensor portion and installed on an inner surface of the windshield F as shown in FIG. 2. Regardless of the above description, the first illuminometer 30 and the second illuminometer 40 may be separated from the rain sensor 50 and installed on a dash panel.

Figure 3:
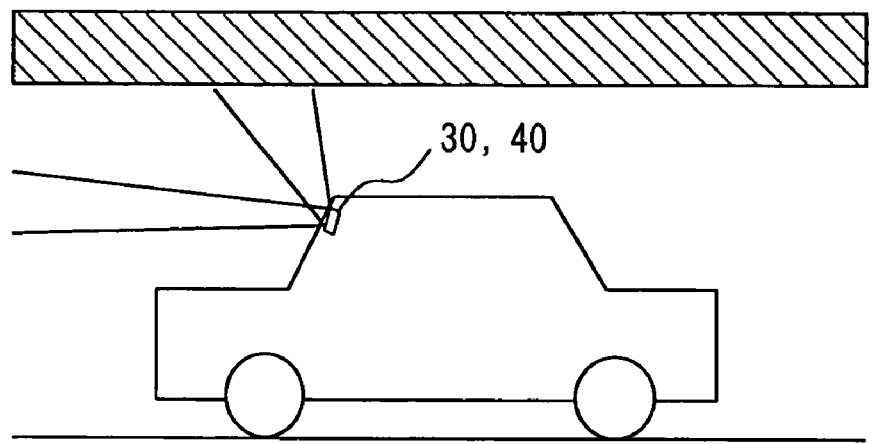
FIG. 3 is a schematic view showing the detection state by a first illuminometer and a second illuminometer according to the embodiment.

As shown in FIG. 3, the first illuminometer 30 includes a photodiode for detecting an illuminance on a plane facing an upper space of the vehicle and outputs a first detection signal indicating the illuminance to the control circuit 20. The second illuminometer 40 includes a photodiode for detecting an illuminance on another plane facing a front space of the vehicle and outputs a second detection signal indicating the illuminance to the control circuit 20.

Figure 4:
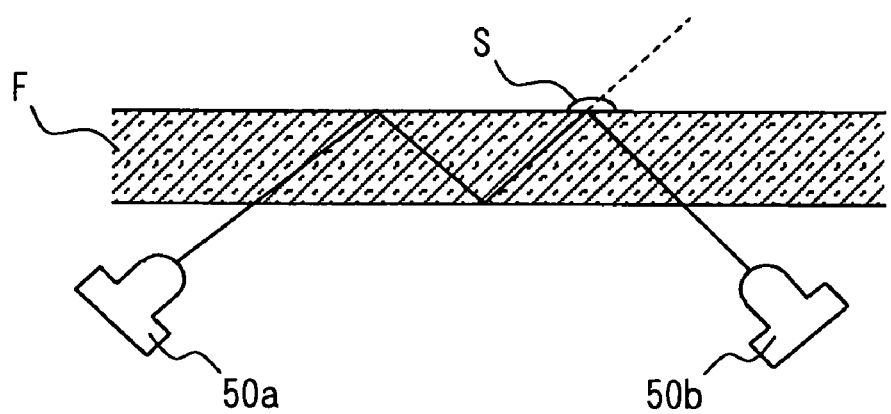
FIG. 4 is a schematic view showing the detection state by a rain sensor according to the embodiment.

As shown in FIG. 4, the rain sensor 50, which detects the precipitation amount, has a ray emitter 50a for emitting an infrared ray toward the windshield F and a ray receptor 50b receiving the infrared ray reflected by the surface of the windshield F. The ray emitter 50a emits the infrared rays in respective intensities according to the current value determined by the control circuit 20.

In a case that a raindrop adheres to the windshield F within a detection range by the rain sensor 50, the intensity of the infrared rays received by the ray receptor 50b is lower than a case that no raindrop adheres to the windshield F. The rain sensor 50 thus detects the rainfall amount based on an amount of change in the intensity of the infrared rays received by the ray receptor 50b and outputs a detection signal indicating the precipitation amount to the control circuit 20.

The control circuit 20 compares the detection signal of the rain sensor 50 indicating the precipitation amount and a threshold value for determining whether to automatically activate the wiper motor 60. When the detection signal indicating the precipitation amount exceeds the threshold value, the control circuit 20 determines the driving signal according to the precipitation amount and outputs the driving signal to the wiper motor 60.

The control circuit 20 determines the current value to be high when it is nighttime and to be low when it is daytime. The night level is set larger than the daytime level. While, the control circuit 20 determines whether to activate the wiper motor 60 based on the threshold values of a tunnel level when the vehicle is traveling out of the roofed space, and based on the threshold value of a normal level except when the vehicle is traveling out of the roofed space. The tunnel level is set smaller than the normal level.

The wiper motor 60 actuates the wiper 70 according to the driving signals determined by the control circuit 20. Thus, the wipers 70 of the driver side and of the passenger side wipe the respective ranges of the windshield F.

The RAM 80 is a memory field used for a process of the control circuit 20, such as a temporal memory of the operation mode of the wiper 70 before the vehicle's entry into the roofed space. The ROM 90 memorizes programs to be executed by the control circuit 20, and so on.

Figure 5:
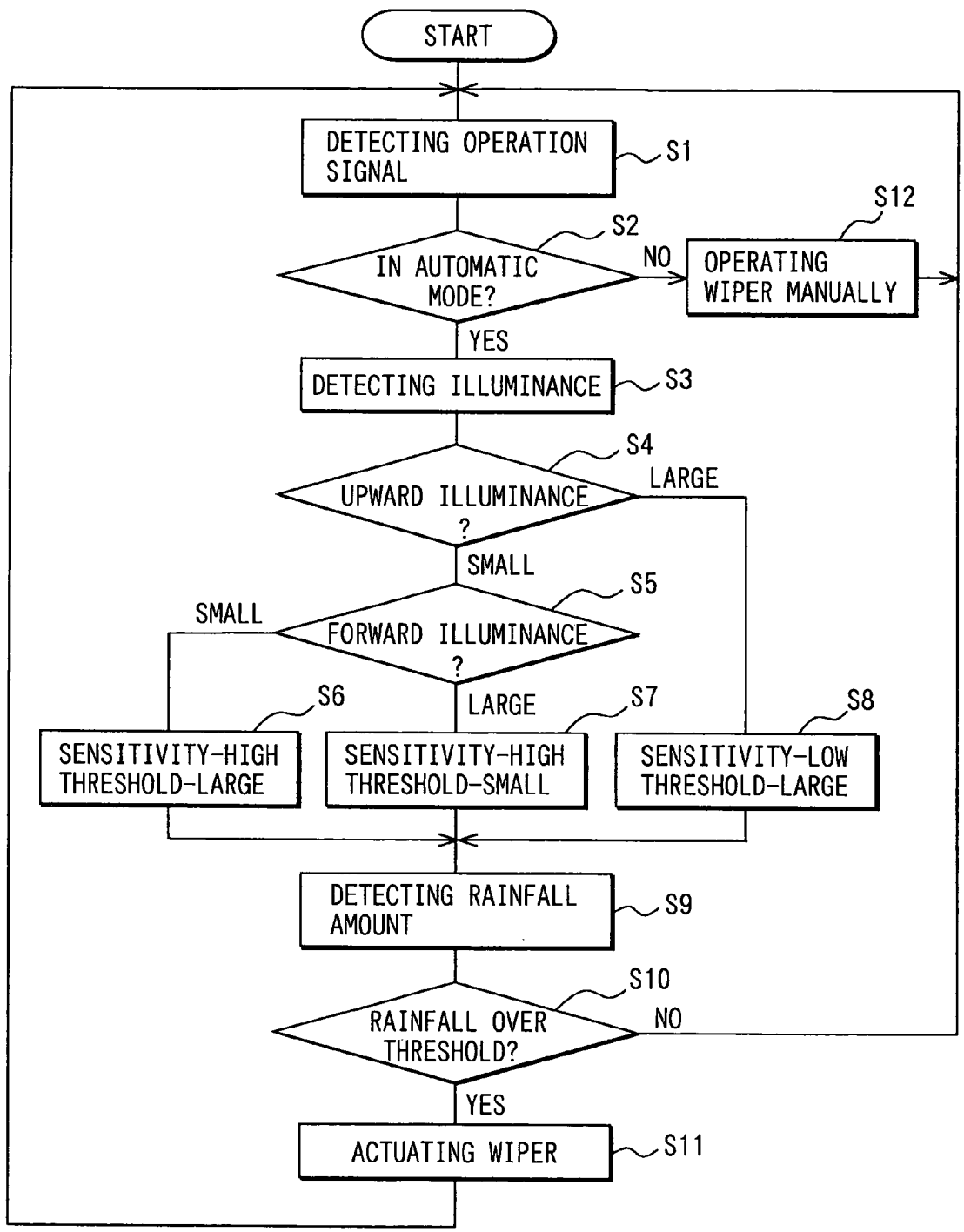
FIG. 5 is a flowchart of an operation process of a wiper control method for operating a wiper of a vehicle according to the embodiment.

The wiper control apparatus 100 according to this embodiment operates as shown in FIG. 5, which depicts an operation flow of the wiper control apparatus 100. This operation flow of the wiper control apparatus 100 starts by turning on the ignition switch (not shown), that is, when the wiper control apparatus 100 is supplied electricity from the battery (not shown) of the vehicle.

In step S1, the control circuit 20 detects the operation signal sent from the wiper switch 10 indicating whether the wiper control apparatus 100 is in the automatic mode or manual mode.

In step S2, the control circuit 20 determines whether the wiper control apparatus 100 is in the automatic mode or in the manual mode based on the operation signal detected in step S10. When the control circuit 20 determines that the apparatus 100 is in the automatic mode, the process goes to step S3 to operate the wiper 70 in the automatic mode. When the control circuit determines that the apparatus 100 is in the manual mode by the operation signal indicating any one of the stop mode, the intermittent mode, the slow mode and the fast mode, the process goes to step S12 to operate the wiper 70 in the manual mode.

In step S12, the control circuit 20 determines the driving signal according to the operation signal and outputs the driving signal to the wiper motor 60 to actuate the wiper 70 according to the operation mode selected by the wiper switch 10.

In step S3, the control circuit 20 detects illuminance indicated by the detection signals detected by the first illuminometer 30 and the second illuminometer 40.

In step S4, the control circuit 20 determines whether the illuminance on the plane facing the upward space of the vehicle is large or small based on the detection signal generated by the first illuminometer 30 and detected in the step S3. When the illuminance detected by the first illuminometer 30 is small, the process goes to step S5 to determine whether the vehicle is outside of the roofed space in night time or the vehicle is traveling out of the roofed space in daytime. When the illuminance detected by the first illuminometer 30 is large, it is assumed that the vehicle is outside of the roofed space in daytime and the process goes to step S8.

In step S8, that is, when it is assumed that the vehicle is not in the roofed space and it is daytime, the driver's sense of sight is not impaired. Therefore, the control circuit 20 determines the current value through the ray emitter 50a to a daytime level (low sensitivity), and the threshold value for determining whether to activate the wiper motor 60 to the large level.

In step S5, the control circuit 20 determines whether the illuminance on the place facing a front space of the vehicle is large or small based on the detection signal generated by the second illuminometer 40. When the illuminance detected by the second illuminometer 40 is small, that is, when it is assumed to be nighttime, the process goes to step S6. When the illuminance detected by the second illuminometer 40 is large, that is, when it is assumed that the vehicle is traveling out of the roofed space in daytime, the process goes to step S7.

In step S6, that is, in nighttime, the driver's sense of sight is impaired. If it rains, the driver's sense of sight is further impaired. Therefore, it is required to activate the wiper 70 in a short response time when the vehicle is traveling in nighttime out of the roofed space into outside where it is raining, to secure a required level of the driver's sense of sight. Thus, the control circuit 20 determines the current value through the ray emitter 50a to the nighttime level (high sensitivity), and the threshold value for determining whether to activate the wiper motor 60 to the large level.

By setting the current value flowing through the ray emitter 50a to the nighttime level, which is larger than the daylight level, the intensity of the infrared rays emitted by the ray emitter 50a becomes larger than that when the current value is set to the daytime level. Thus, a detection range on the windshield F when it is nighttime is larger than the detection range in daytime. Accordingly, the precipitation amount detected by the rain sensor 50 in nighttime is larger than that in daytime, so that the rain sensor 50 can generate in nighttime the detection signal in a shorter response time than that in daytime.

In step S7, that is, when the vehicle is traveling out of the roofed space in daytime, the driver's sense of sight is temporarily impaired during adaptation to light. If it rains, the driver's sense of sight is further impaired, so that it is required to activate the wiper 70 in a short response time when the vehicle is traveling in daytime out of the roofed space into outside where it is raining, to secure a required level of the driver's sense of sight. Thus, the control circuit 20 determines the current value through the ray emitter 50a to the nighttime level, and the threshold value for determining whether to activate the wiper motor 60 to the tunnel level.

As described above, by setting the current value flowing through the ray emitter 50a to the nighttime level, which is larger than the daylight level, the intensity of the infrared rays emitted by the ray emitter 50a becomes larger than that when the current value is set to the daytime level. Thus, a detection range on the windshield F when the vehicle is traveling out of the roofed space is larger than the detection range in daytime. While, the threshold value for determining whether to activate the wiper motor 60 is set to the tunnel level smaller than the threshold value of the normal level, so that the rain sensor 50 can generate the detection signal when the vehicle is traveling out of the roofed space by detecting the precipitation amount smaller than that required for the rain sensor 50 to generate the detection signal when the vehicle is not traveling out of the roofed space in daytime or in nighttime.

Thus, when the vehicle is traveling out of the roofed space, the wiper control apparatus 100 can activate the wiper 70 in an early timing by the increased detection sensitivity of the rain sensor 50 and the decreased threshold value relative to a unit precipitation amount. Only decreasing the threshold value serves to start the wiper 70 in a short response time, so that the detection sensitivity of the rain sensor 50 may not always be increased together with decreasing the threshold value.

In step S9, the control circuit 20 directs the rain sensors 50 to detect the precipitation amount by making a current value determined in any one of steps S6 to S8 flow through the ray emitter 50a, to determine whether to activate the wiper motor 60 or not.

In step S10, the control circuit 20 determines whether the precipitation amount detected in step S9 is smaller than the threshold value determined in any one of steps S6 to S8. When the precipitation amount is larger than the threshold value, that is, it is assumed that it is raining and that the wiper 70 should be activated, the process goes to step S11.

When the precipitation amount is smaller than the threshold value, that is, it is assumed that it is not raining and that the wiper 70 should not be activated, the process returns to step S1.

In step S11, the control circuit 20 outputs the driving signal according to the detection signal indicating the precipitation amount detected by the rain sensor 50 to the wiper motor 60, so that the wiper 70 wipes a wiping range of the windshield F.

As a modification of the above embodiment, in a case that the illuminance on the plane facing the front space of the vehicle is large in step S5 and also in step 10, the detection signal is larger than the threshold value determined in step S7, the control circuit 20 may store the operation mode when the vehicle is traveling into the roofed space a in the RAM 80 and output a driving signal to the wiper motor 60 to operate in the operation mode stored in the RAM 80 when the vehicle is traveling out of the roofed space.

As another modification of the above embodiment, the wiper control apparatus 100 may include a recording media such as a hard disk storing a table data associating the detection signals indicating the precipitation amount during the manual mode with the driving signals of the wiper motor 60. Thus, in a case that the illuminance in front of the vehicle is large in step S5, and in step 10, the detection signal is larger than the threshold value determined in step S7, the control circuit 20 compares the detection signal detected by the rain sensor 50 with the table data memorizing the precipitation amount. Thus, the control circuit 20 can extract the driving signal according to the detection signal indicating the precipitation amount and output the driving signal to the wiper motor 60. Accordingly, the wiper control apparatus 100 can operate the wiper 70 in the operation mode according to the driver's preference.

As a third modification of the above embodiment, the wiper 70 may be activated on a condition that the rain sensor 50 continues to detect precipitation whose amount is over a threshold value for a predetermined time. In this case, the response time of the wiper 70 just after the vehicle travels out of the roofed space may be shortened so as to activate the wiper 70 in an earlier timing. It is a matter of course that the reduction of the threshold value and the shortening the response time may be adopted together.

The wiper control apparatus 100 may cooperate with the position detection apparatus such as GPS receivers and mapping apparatus storing the mapping data including the positions of roofed spaces such as tunnels and bridges. In this case, the wiper control apparatus 100 can determine whether the vehicle is traveling into the roofed space and whether the vehicle is traveling out of the roofed space, based on the vehicular position detected by the position detection apparatus and the mapping data stored in the mapping apparatus.

The wiper control apparatus 100 also may include an image sensor implemented by cameras such as CCD and CMOS. In this case, the wiper control apparatus 100 can determine whether the vehicle is traveling into the roofed space and whether the vehicle is traveling out of the roofed space using the image sensor.

What is claimed is:

1. A wiper control apparatus for operating a wiper of a vehicle comprising:
   a precipitation detector detecting a precipitation condition at a position where the vehicle is;
   a surrounding state detector detecting an exit of the vehicle out of a roofed space; and a wiper controller controlling the wiper to be in an operation mode according to the precipitation condition detected by the precipitation detector, and controlling the precipitation detector to detect the precipitation condition following the exit detected by the surrounding state detector in a response time shorter than another response time for the precipitation detector to detect the precipitation not following the exit.

2. The wiper control apparatus according to claim 1, wherein the precipitation condition includes a precipitation amount.

3. The wiper control apparatus according to claim 2, wherein the wiper controller activates the wiper when the precipitation detector detects a precipitation amount more than a predetermined threshold value, and decreases the predetermined value when the surrounding state detector detects the exit.

4. The wiper control apparatus according to claim 1, wherein:
the wiper controller activates the wiper when the precipitation detector detects the precipitation condition for a period more than a predetermined threshold time, and decreases the predetermined time when the surrounding state detector detects the exit.

5. The wiper control apparatus according to claim 1, wherein the wiper controller increases a sensitivity of the precipitation detector when the surrounding state detector detects the exit.

6. The wiper control apparatus according to claim 1, wherein:
the surrounding state detector further detects an entry of the vehicle into the roofed space; and
the wiper controller memorizes an operation mode when the surrounding state detector detects the entry, and actuates the wiper in the memorized operation mode when the surrounding state detector detects the exit subsequent to the entry.

7. The wiper control apparatus according to claim 1, wherein:
the wiper is also controlled according to manipulated state set by a driver of the vehicle; and
the wiper controller memorizes combinations of the operation mode manually set by the driver of the vehicle and the precipitation condition, and controls the wiper to be in the memorized operation mode corresponding to the precipitation condition in the combinations.

8. The wiper control apparatus according to claim 1, wherein the surrounding state detector includes:
a first photosensor for detecting an illuminance generally on a top face of the vehicle; and
a second photosensor for detecting an illuminance generally on a front face of the vehicle.

9. The wiper control apparatus according to claim 1, wherein the surrounding state detector includes:
a mapping data recorder storing a map data having information where the roofed space is; and
a position detector detecting a position of the vehicle in the mapping data.

10. The wiper control apparatus according to claim 1, wherein the surrounding state detector includes:
an image sensor taking an image of a sight in front of the vehicle.

11. A wiper control method for operating a wiper of a vehicle comprising steps of:
detecting an exit of the vehicle out of a roofed space;
detecting a precipitation condition at a position of the vehicle in a long response time when the exit is not detected, and in a short response time shorter than the long response time when the exit is detected; and
controlling the wiper to be in an operation mode according to the detected precipitation condition.

12. The wiper control method according to claim 11, wherein the detecting step of the precipitation condition processes with a sensor, whose sensitivity is set to a low level when the exit is not detected and to a high level higher than the low level when the exit is detected.

13. The wiper control method according to claim 12, wherein the detecting step of the precipitation condition processes with a infrared rays, whose intensity is set to a low value when the exit is not detected and set to a high value higher than the low value when the exit is detected.

14. The wiper control method according to claim 12, wherein the detecting step of the precipitation condition processes with a detection number of raindrops in a predetermined time more than a predetermined threshold, which is set to a small threshold when the exit is not detected and set to a high threshold higher than the small threshold when the exit is detected.

* * * * *